L. B. KEELER.
Reciprocating Churns.
No. 140,280.  Patented June 24, 1873.
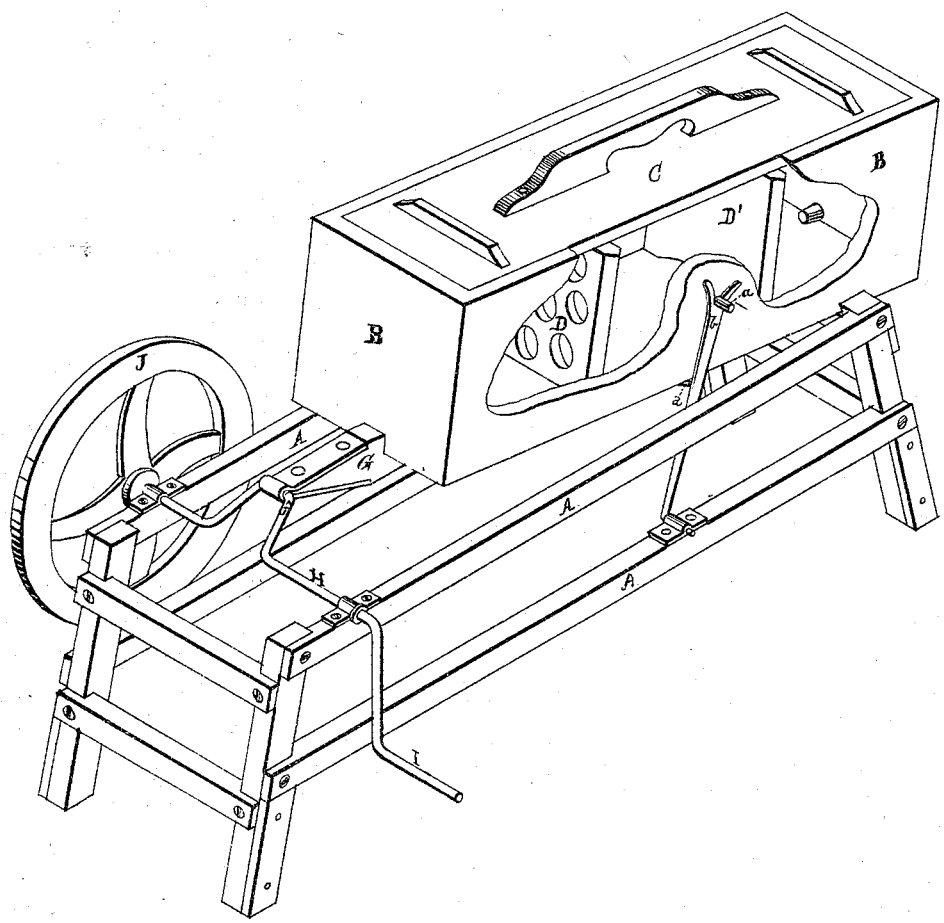
Witnesses
John A. Eelis
E. J. Falconer
Inventor
Lucius B. Keeler
Per
T. H. Alexander H.
atty

UNITED STATES PATENT OFFICE.

LUCIUS B. KEELER, OF WESTERVILLE, OHIO.

IMPROVEMENT IN RECIPROCATING CHURNS.

Specification forming part of Letters Patent No. 140,280, dated June 24, 1873; application filed April 16, 1873.

*To all whom it may concern:*

Be it known that I, LUCIUS B. KEELER, of Westerville, in the county of Franklin and State of Ohio, have invented certain new and useful Improvements in Churns; and I do hereby declare that the following is a full, clear, and exact description thereof, reference being had to the accompanying drawings and to the letters of reference marked thereon, which form a part of this specification.

The nature of my invention consists in the construction and arrangement of a churn as will be hereinafter more fully set forth.

In order to enable others skilled in the art to which my invention appertains to make and use the same, I will now proceed to describe its construction and operation, referring to the annexed drawing, in which—

Figure 1 is a perspective view of my churn, a part of the cream-box being broken open to show the interior of the same.

A represents a frame of suitable form and dimensions to contain the cream-box and crank-shaft. B represents the cream-box made in rectangular form and provided with a tight-fitting lid or cover, C. In the sides of the box B are vertical grooves for the insertion of perforated dashers D, or solid dashers D', as occasion may require. On the outside of the box on each side is a pivot, $a$, and these pivots are placed in the upper forked ends of arms $b$ $b$, which are pivoted to the frame A and connected by a cross-bar, $d$, forming a tilt for the box. To the bottom of the box B, at one end, is secured a bar, G, which connects with the shaft. On one end of this shaft is a crank, I, for turning the same, and on the other end is a fly-wheel, J, to secure regular motion.

The perforated partitions or dashers D D are placed in the box B and the cream put in, when the lid is put on, and then by turning the crank I the cream-box obtains a back-and-forth as well as a tilting motion. When the butter has come the perforated partitions D are removed and the solid partitions D' inserted, and the butter may be readily gathered into solid rolls and may be quite well worked by a slower motion of the crank I. After the lid is removed the crank $f$ is elevated to its highest point, a plug in the end of the box is removed, allowing the butter-milk to pass out, when, by pouring in a sufficient amount of water, the butter is rinsed in a moment. The box can readily be detached for cleaning, and attached again when needed for use.

Having thus fully described my invention, what I claim as new, and desire to secure by Letters Patent, is—

1. The forked tilts $b$ and cross-bar $d$, the said tilts being pivoted to the frame A, and the forked ends of the tilts forming a bearing for the journals $a$, which are secured to the cream-box B, as and for the purpose herein specified.

2. The cream-box B, provided with the journals $a$ for connection with the tilts $b$, in combination with the bar G, shaft H, crank I, and frame A, substantially as and for the purpose set forth.

In testimony that I claim the foregoing as my own I affix my signature in presence of two witnesses.

LUCIUS B. KEELER.

Witnesses:
J. R. CLARK,
J. TIMMONS.